United States Patent
Paterik (10) Patent No.: US 7,643,475 B1
(45) Date of Patent: *Jan. 5, 2010

(54) CALL RELEASE IN A COMMUNICATION NETWORK

(75) Inventor: Thomas L. Paterik, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 980 days.

This patent is subject to a terminal disclaimer.

(21) Appl. No.: 10/987,655

(22) Filed: Nov. 12, 2004

(51) Int. Cl.
*H04L 12/50* (2006.01)

(52) U.S. Cl. .................. 370/357; 370/401; 370/522; 379/229; 379/93.14; 379/221.14

(58) Field of Classification Search ............... 379/211, 379/221, 217, 210.01; 455/445, 422, 428, 455/432
See application file for complete search history.

(56) References Cited

U.S. PATENT DOCUMENTS

| | | | | |
|---|---|---|---|---|
| 5,805,691 A * | 9/1998 | Dendi | ................... | 379/221.01 |
| 5,884,179 A * | 3/1999 | Patel | ........................ | 455/445 |
| 6,415,025 B1 * | 7/2002 | Bruno et al. | ................ | 379/143 |
| 2003/0072430 A1 * | 4/2003 | Berranger | ............. | 379/210.01 |
| 2003/0152209 A1 * | 8/2003 | Andreason | ............. | 379/211.01 |

* cited by examiner

*Primary Examiner*—Curtis Kuntz
*Assistant Examiner*—Phung-Hoang J Nguyen (57) ABSTRACT

A communication network comprising a first node and a second node. The first node is configured to transfer a first control message for a call having an inbound call path and an outbound call path wherein the first control message indicates a release request. The second node is configured to receive the first control message from the first node and process the first control message to determine if the second node has two legs of the inbound call path. If the second node has two legs of the inbound call path, a second control message is transferred to a third node in the outbound call path wherein the second control message indicates the release request.

20 Claims, 9 Drawing Sheets

CALL RELEASE IN A COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to communication networks, and in particular, to call release systems and methods.

2. Description of the Prior Art

Advances in telecommunication technologies have allowed for the development of many new services. Often times, services are provided by what are commonly referred to as service platforms. For example, voicemail is a service provided by a service platform. When a caller wishes to retrieve his voicemail messages, his call is routed to a service platform. Another example of a service includes automated telephone banking. When a caller wishes to retrieve his bank account status, his call is routed to a service platform.

Figure 1:
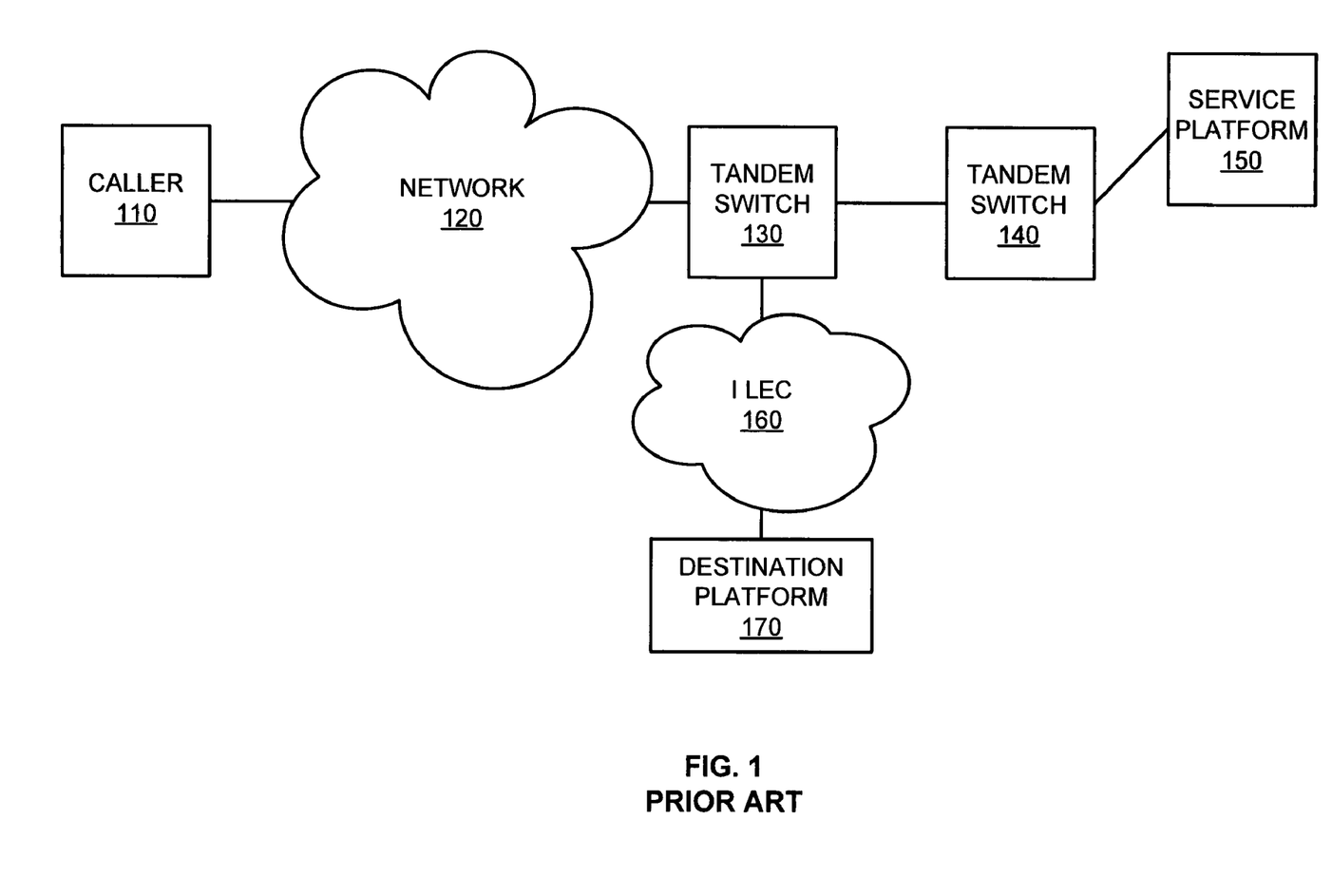
FIG. 1 illustrates a telecommunication system in an example of the prior art.

Tromboning, also referred to in the art as hair pinning, is a well known problem associated with service platform calls. Tromboning occurs when a call to a service platform is re-routed to another destination and the service platform remains in the call loop. FIG. 1 illustrates telecommunication system 100 in the prior art where a caller first calls a service platform and is then re-routed to another destination.

Figure 2:
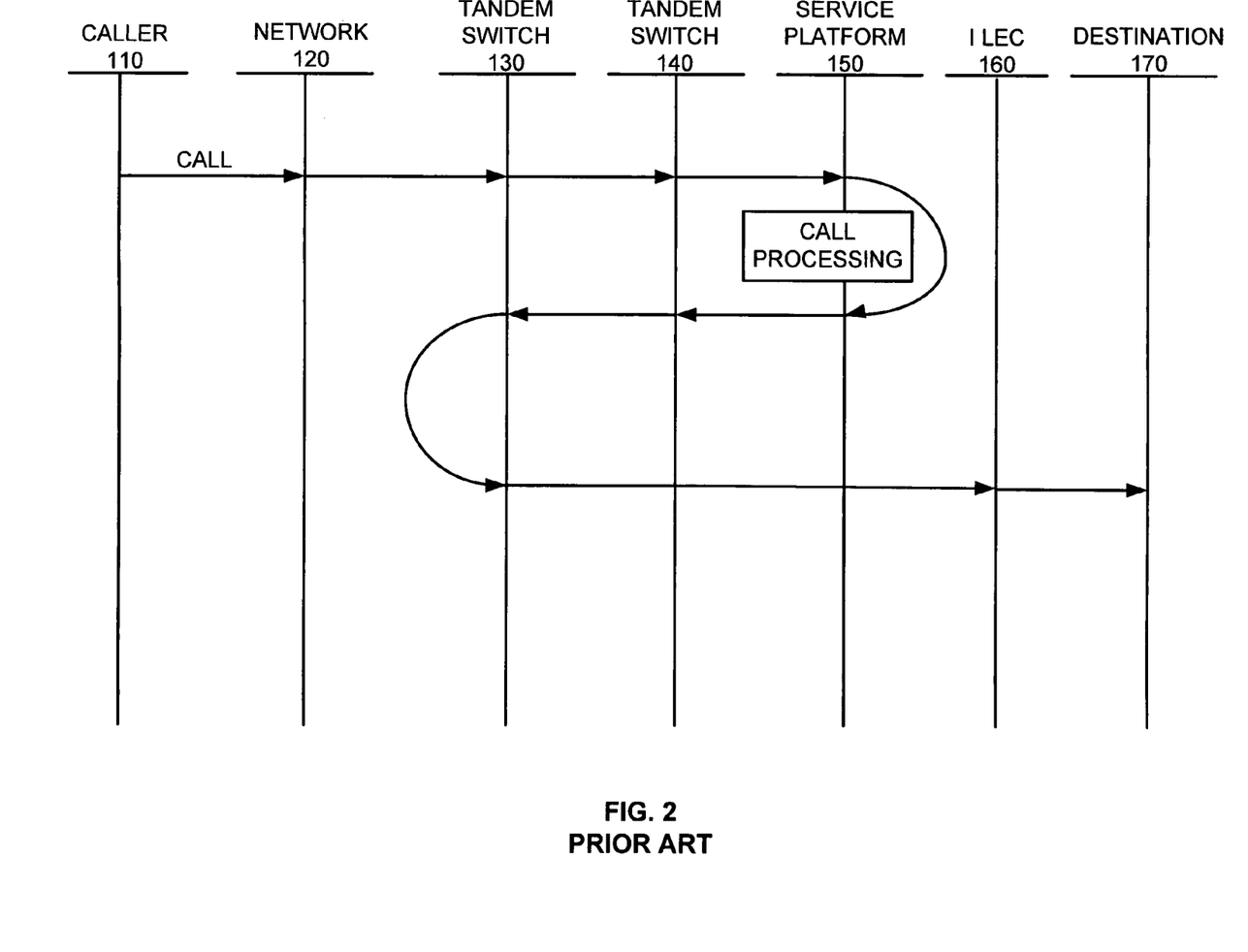
FIG. 2 illustrates tromboning in an example of the prior art.

FIG. 1 includes caller 110, network 120, tandem switch 120, tandem switch 140, service platform 150, Incumbent Local Exchange Carrier (ILEC) 160, and destination platform 170. FIG. 2 illustrates tromboning in prior art telecommunication system 100.

In operation, a call is placed from caller 110 to service platform 150. The call is routed from caller 110 through network 120, tandem switch 130, and tandem switch 140, to service platform 150. The call is processed in service platform 150. For instance, service platform 150 could be a voicemail system providing voicemail services to the caller.

While processing the call, the voicemail system determines that the call needs to be re-routed to destination platform 170. Service platform 150 then out-dials the phone number for the call. The call is connected from service platform 150 through tandem switches 140 and 130 and ILEC 160 to destination platform 170. As illustrated, the call connection between caller 110 to destination system 170 is connected through service platform 150. Such tromboning takes up valuable resources in service platform 150 and in the system as a whole.

Figure 3:
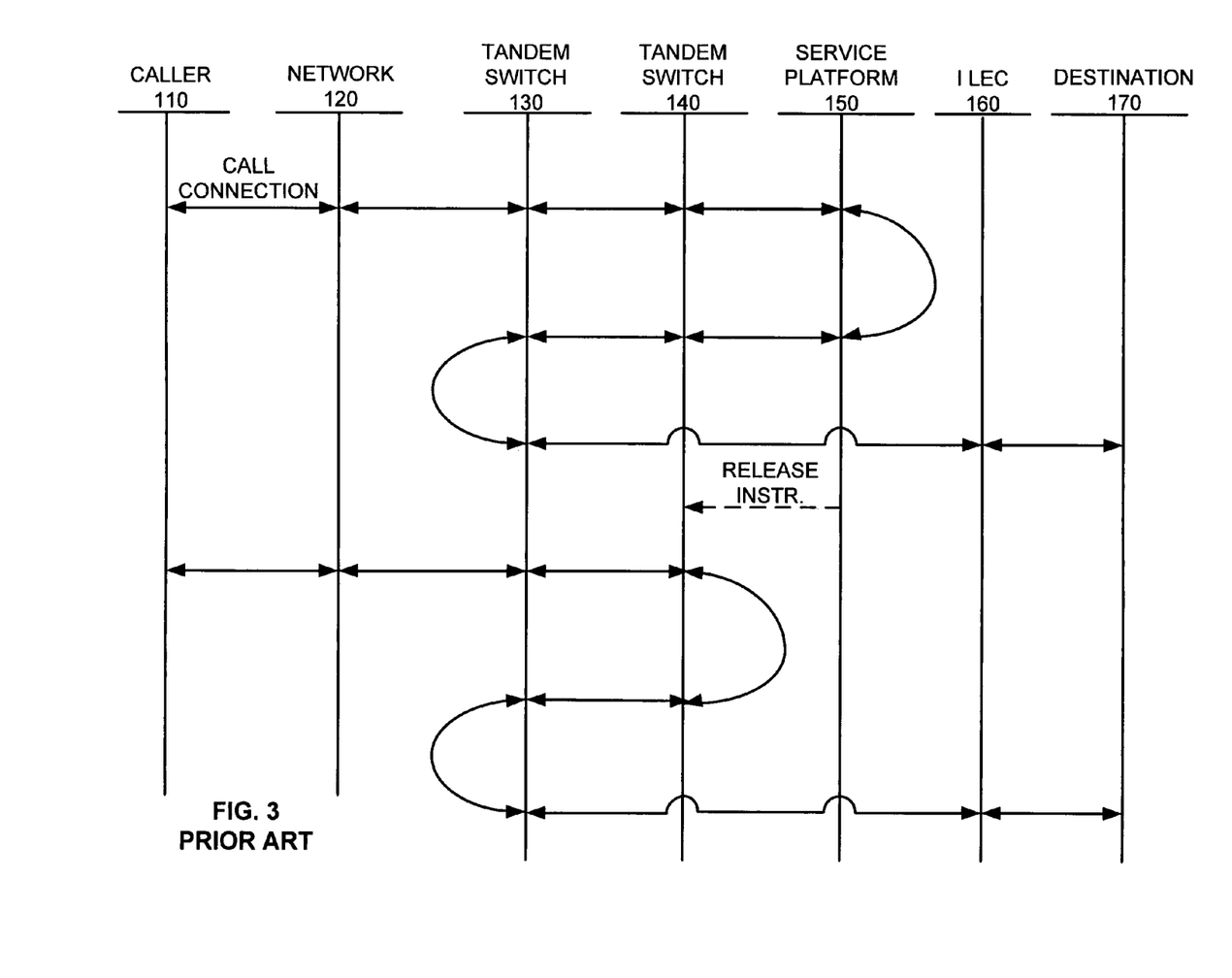
FIG. 3 illustrates tromboning in an example of the prior art.

FIG. 3 illustrates Release Link Trunking in the prior art. Release Link Trunking is one prior art solution to the problem of tromboning. With Release Link Trunking, caller 110 is connected to service platform 150 through network 120 and tandem switches 130 and 140. Upon determining the call should be transferred to destination platform 170, service platform 150 signals tandem switch 140 with instructions to release the call leg between tandem switch 140 and service platform 150. The signaling also instructs tandem switch 140 that a new call leg is required to destination platform 170. The new call leg is setup from tandem switch 140 through tandem switch 130 and ILEC 160 to destination platform 170.

One problem with this solution is that tromboning still occurs in tandem switch 140. As illustrated, a first call leg for the call exists between tandem switch 130 and tandem switch 140. A second call leg from tandem switch 140 to tandem switch 130 folds back over the first call leg. Thus, tandem switch 140 remains in the call loop. Such a configuration wastes the resources of tandem switch 140, such as processing power and trunk capacity.

SUMMARY OF THE INVENTION

An embodiment of the invention helps solve the above problems and other problems by eliminating tromboning in a call. In particular, an embodiment of the invention eliminates tromboning earlier in a call path than in the prior art. In another embodiment of the invention, tromboning is not eliminated entirely, but is moved back further in the call path than in the prior art.

In an embodiment of the invention, a communication network comprises a first node and a second node. The first node is configured to transfer a first control message for a call having an inbound call path and an outbound call path wherein the first control message indicates a release request. The second node is configured to receive the first control message from the first node and process the first control message to determine if the second node has two legs of the inbound call path. If the second node has two legs of the inbound call path, a second control message is transferred to a third node in the outbound call path wherein the second control message indicates the release request.

In an embodiment of the invention, the communication network further comprises a third node configured to transfer a third message to the second node wherein the third message indicates that the third node does not have two legs of the inbound call path.

In an embodiment of the invention, the second node is further configured to receive the third control message from the third node and in response to the third control message transfer a fourth control message to the first node indicating a tear down instruction for segments of the inbound call path and the outbound call path between the second node and the first node.

In an embodiment of the invention, the second node is further configured to bridge the inbound call path and the outbound call path.

In an embodiment of the invention, the first node is further configured to transfer a fourth control message to a service node indicating a tear down instruction for segments of the inbound call path and the outbound call path between the first node and the service node.

In an embodiment of the invention, the second node is further configured to, if the second node does not have two legs of the inbound call path, transfer a fifth control message to the first node indicating that the second node does not have two legs of the inbound call path.

In an embodiment of the invention, the first node comprises a tandem switch.

In an embodiment of the invention, the second node comprises a tandem switch.

In an embodiment of the invention, wherein the third node comprises an ingress switch.

In an embodiment of the invention, the first node is further configured to receive the first control message from a service platform.

BRIEF DESCRIPTION OF THE DRAWINGS

The same reference number represents the same element on all drawings.

DETAILED DESCRIPTION OF THE PREFERRED EMBODIMENT

FIGS. 4-9 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

Figure 4:
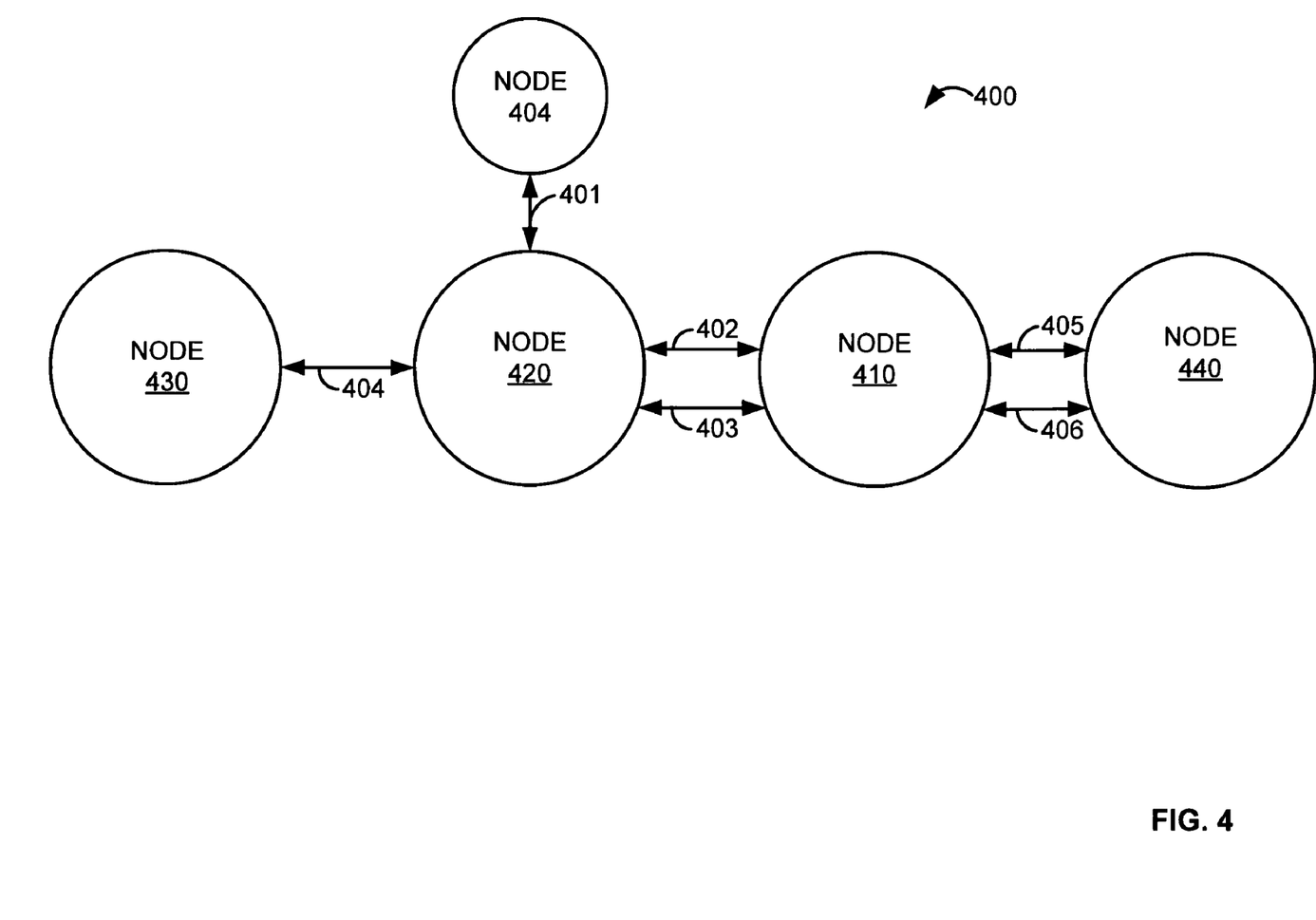
FIG. 4 illustrates a communication network in an embodiment of the invention.
Figure 5:
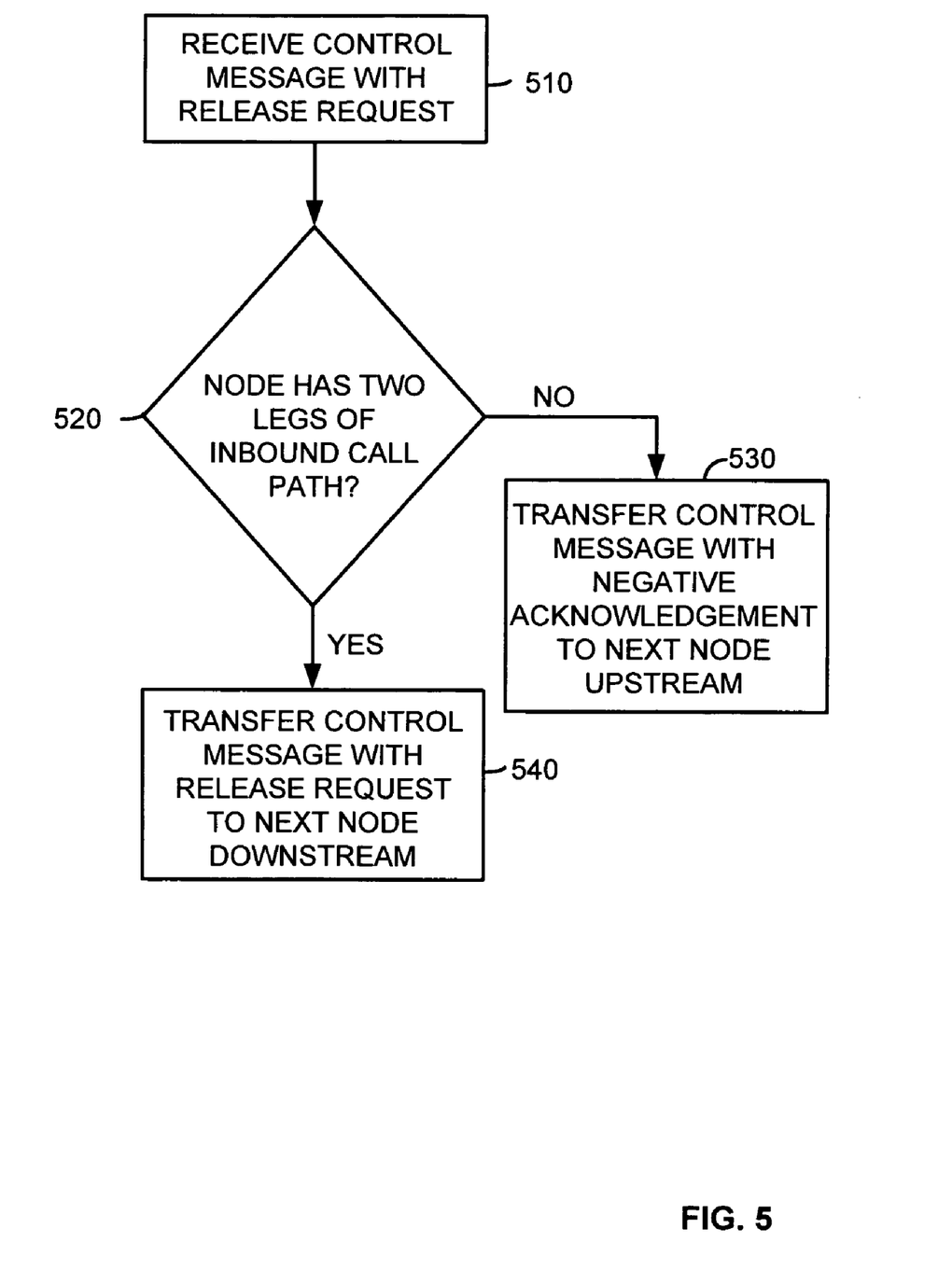
FIG. 5 illustrates the operation of a communication network in an embodiment of the invention.
Figure 6:
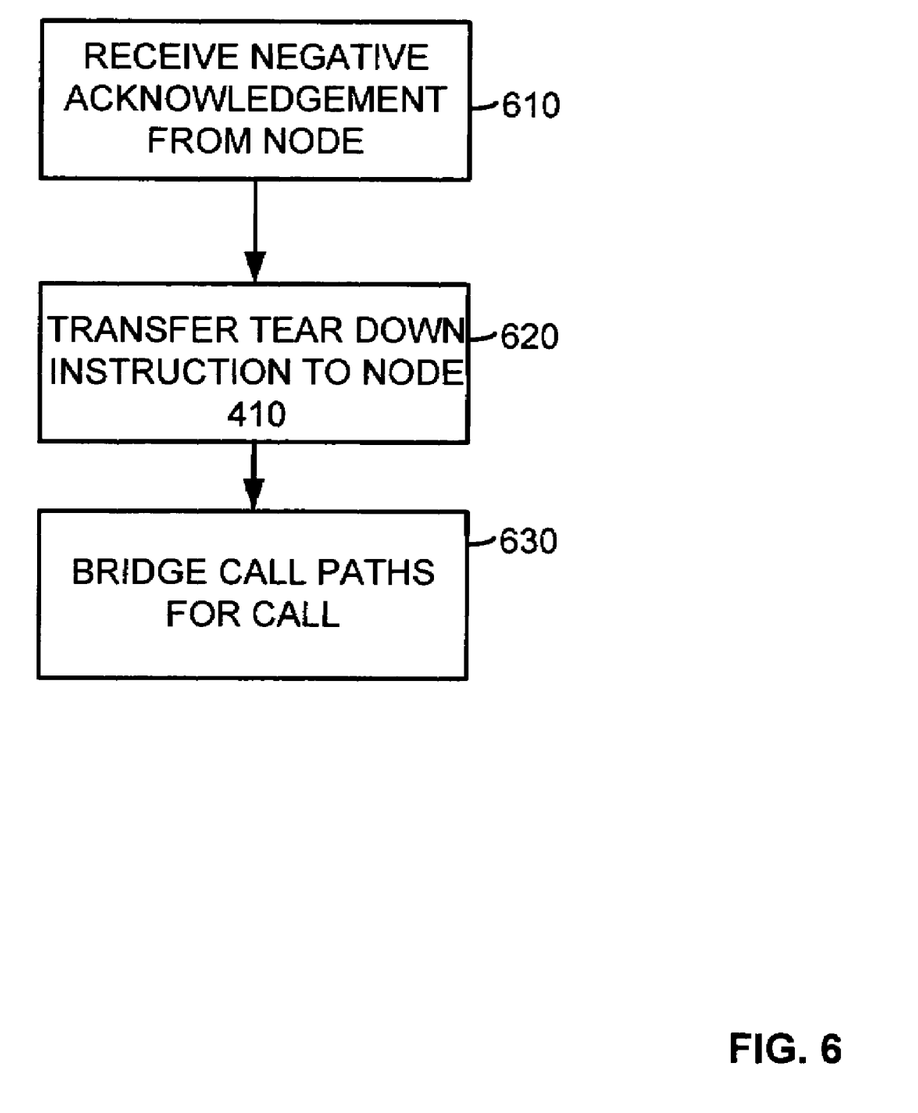
FIG. 6 illustrates the operation of a communication network in an embodiment of the invention.

FIGS. 4-6

FIG. 4 illustrates communication network 400 in an embodiment of the invention. Advantageously, communication network 400 solves the above problems, as well as other problems, by releasing a call at an earlier place in the call than accomplished by the prior art. Such a solution reduces costs, improves latency, and increases trunk capacities.

Communication network 400 includes node 404, node 410, node 420, node 430, and node 440. An inbound call path traverses node 404, node 420, node 410, and node 440. The inbound call path includes inbound call path segments 401, 402, and 405. An outbound call path traverses node 440, node 410, node 420, and node 430. The outbound call path includes outbound call path segments 406, 403, and 404. Call path segments are also commonly referred to as call legs. Communication network 400 could include other nodes and elements which are not presently described for the sake of clarity.

FIG. 5 illustrates the operation of communication network 400 in an embodiment of the invention. In this illustration, a call has been connected from node 404 through nodes 420 and node 410 to node 440. Node 440 could be, for example, a service platform. The incoming call path therefore includes call segments 401, 402, and 405. During the call to node 440, it is determined that a new call should be established from node 440. The new outgoing call path runs from node 440, through nodes 410 and 420, to node 430.

During the call, node 440 determines to release itself from the call. Responsive to this determination, node 440 transmits a control message to node 410 indicating a release request. Node 410 receives the control message (Step 510). Node 410 processes the release request to determine if node 410 has two legs of the incoming call path (Step 520). Upon an affirmative determination, node 410 transfers a control message to the next node downstream in the outbound call path for the call (Step 540). In this case, the next node downstream in the outbound call path is node 420. The control message indicates the release request.

This process is repeated by each node in the outbound call path until a determination is made that the subject node does not have two legs of the inbound call path. The following describes the process of FIG. 5 as applied to node 420. To begin, node 420 receives the control message from node 410 (Step 510). The control message indicates the release request for the call having the inbound and outbound call paths. Node 420 processes the control message to determine if node 420 has two legs of the inbound call path for the call (Step 520). If node 420 has two legs of the incoming call path, a control message indicating the release request is transferred to node 430 (Step 540). If node 420 does not have the two legs of the incoming call path, a control message is transferred to node 410 with a negative acknowledgment that node 420 does not have two call legs of the incoming call path (Step 530). In this case, node 420 has two legs of the incoming call path—segments 401 and 402. Node 420 therefore transfers a control message to node 430—the next node downstream in the outbound call path—indicating the release request.

The following describes the process of FIG. 5 as applied to node 430. Node 430 receives the control message from node 420 (Step 510). Node 430 processes the control message to determine if node 430 has two legs of the inbound call path for the call (Step 520). In this case, node 430 does not have two legs of the inbound call path. In fact, node 430 only has one leg of the outbound call path—segment 404. Node 430 therefore transfers a control message back to node 420 with a negative acknowledgment that node 430 does not have two legs of the inbound call path.

FIG. 6 further illustrates the operation of communication network 400 in an embodiment of the invention. To begin, node 420 receives the control message from node 430 with the negative acknowledgment that node 430 does not have two call legs of the incoming call path for the call. In response to the control message from node 430, node 420 transfers a control message to node 410 with instructions to tear down the call segments 402 and 403. In response to the control message from node 420, node 410 also instructs node 440 to tear down segments 405 and 406. Lastly, so that the call is not dropped, node 420 bridges the incoming call path and outgoing call path for the call.

Advantageously, call segments 402 and 403 are released and torn down, thereby making resources on node 410 available. Further advantageously, segments 405 and 406 are torn town, thereby making resources on node 440 available. The incoming and outgoing call paths have been bridged to form a call path from node 404 through node 420 to node 430 over segments 401 and 404. In an advance over the prior art, tromboning has been eliminated in node 440 and in node 410.

In another embodiment of the invention, a node could, upon determining that it does not have two call legs of the incoming call path for a call, transfer a control message to the next node upstream in the incoming call path. This step is an alternative to transferring a control message to the next node downstream in the outgoing call path. Continuing with this alternative, the next node would receive the control message and determine if it, the next node, has two legs of the incoming call path. If so, the same node would then determine if it also has any legs of the outgoing call path. If not, the same node transfers a negative acknowledgment message back to the previous node. If so, the same node would transfer a control message to the next node upstream in the incoming call path.

This process would repeat until a node determines that it has two legs of the incoming call path but no legs of the outgoing call path. Such a node would be one removed from the pivot node. By transferring a negative acknowledgement to the previous node (the source of the control message), the previous node is made aware of its status as the pivot node. It should be known that the terms inbound, outbound, outgoing, upstream, and downstream, as well as other terms, are relative terms used by those skilled in the art to differentiate between calls, call paths, call legs, and the like, and to provide perspective when describing embodiments of the invention. Such terms are used for illustrative purposes and are not limiting.

Second Embodiment Configuration and Operation

Figure 7:
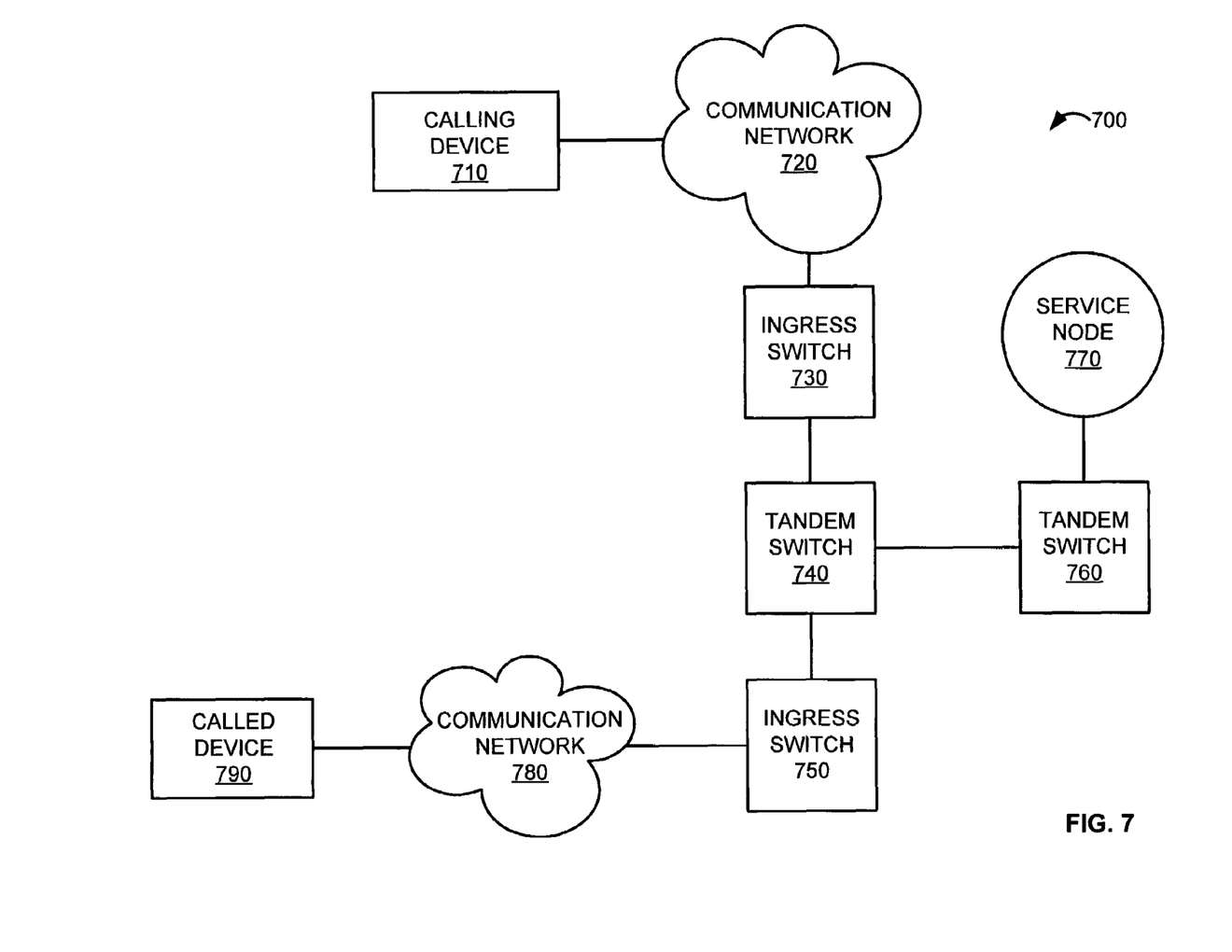
FIG. 7 illustrates the operation of a communication network in an embodiment of the invention.
Figure 8:
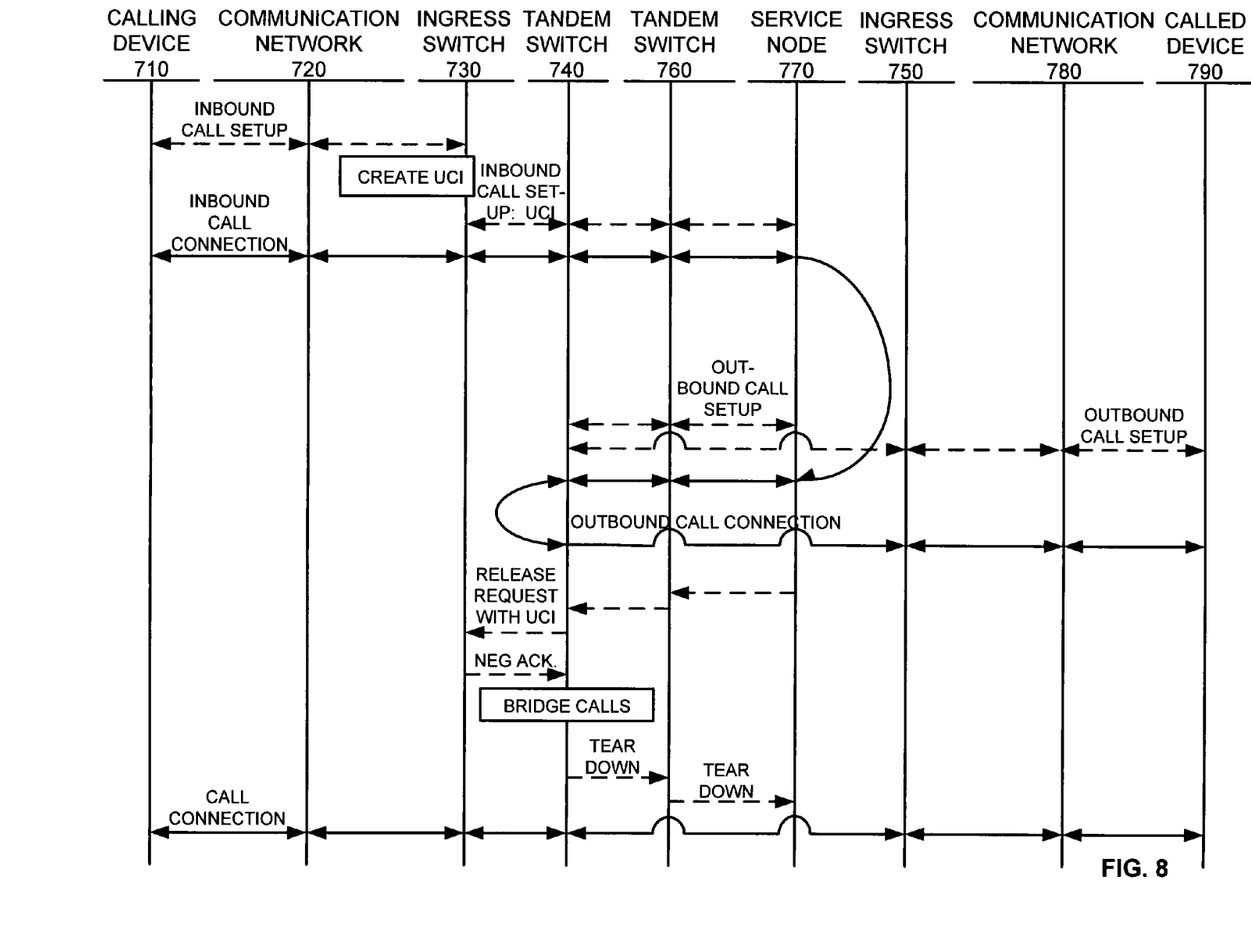
FIG. 8 illustrates a call flow diagram in an embodiment of the invention.

FIGS. 7 and 8

FIG. 7 illustrates communication network 700 in an embodiment of the invention. Communication network 700 includes calling device 710 coupled to communication network 720. Calling device 710 could be, for example, a wireless communication device, a wireline communication device, a packet based communication device, a non-packet based communication device, as well as other types of devices. Communication network 720 could be a wireless or wireline communication network, a local area network (LAN), a wide area network (WAN), a packet based or non-packet based communication network, as well as other types of networks.

Communication network 700 also includes ingress switch 730, tandem switch 740, trandem switch 760, and ingress switch 750. Ingress switch 730 is coupled to communication network 720. Thus, ingress switch 730 provides an access point for communications to and from communication network 720. Ingress and tandem switches are well known in the art. Tandem switch 760 is coupled to service node 770. Service node 770 provides a service for a call. For example, the service node could be a voicemail service platform, a bill processing service platform, a customer service related service platform, as well as other types of service platforms.

Ingress switch 750 provides an access point for communication to and from communication network 780. Communication network 780 could be a wireless or wireline communication network, a packet or non-packet based communication network, a LAN, a WAN, as well as other types of network. Called device 790 is coupled to communication network 780. Called device 790 could be, for example, a wireless communication device, a wireline communication device, a packet based device, a non-packet based device, as well as other types of devices.

FIG. 8 illustrates a call flow diagram in an embodiment of the invention. In operation, a caller uses calling device 710 to place a call to service node 770. The call is routed through communication network 720 to ingress switch 730. Standard call setup messages for the inbound call setup are exchanged between communication network 720 and ingress switch 730 as is well known in the art. During call setup, ingress switch 730 creates a unique call identifier (UCI). The UCI could be comprised of the switch identification (switch ID) for ingress switch 730 and a uniquely generated ID for the call. The UCI could be passed as a single concatenated number (switch ID+call ID), or it could be passed in two separate fields. As call setup continues, the UCI is passed to each switch in the inbound call path. Ingress witch 730 passes the UCI to tandem switch 740. Tandem switch 740 passes the UCI to tandem switch 760. Tandem switch 760 passes the UCI to service node 770.

From ingress switch 730, the call is routed through tandem switches 740 and 760 to service node 770. While the caller interacts with service node 770, a determination is made to establish an outgoing leg of the call from service node 770 to called device 790. For example, service node 770 could be a voicemail service platform. After listening to a message previously left by a user using called device 790, the caller could choose to automatically call back the user of called device 790. Service node 770 would then outdial called device 790. The outbound call is then established from service node 770 through tandem switches 760 and 740 to ingress switch 750. From ingress switch 750, the outbound call extends through communication network 780 to called device 790.

As illustrated in FIG. 8, tromboning occurs in service node 700 where the inbound call is connected to the outbound call. To remedy this, service node 770 transfers a release request to tandem switch 760. The release request includes the UCI for the inbound call. Tandem switch 760 receives the release request with the UCI and extracts the call ID from the UCI. Tandem switch 760 then checks if it has two call legs for the inbound call associated with the call ID. If so, tandem switch transfers the release request, along with the UCI, to the next node downstream in the outbound call path. In this case, the next node is tandem switch 740.

Tandem switch 740 receives the release request from tandem switch 760 and extracts the call ID from the UCI. Tandem switch 740 then checks if it has two call legs for the inbound call associated with the call ID. Having determined affirmatively that it does have two legs of the inbound call, tandem switch 740 transfers the release request, along with the UCI, to the next node downstream in the outbound call path. In this case, the next node downstream is ingress witch 750.

Ingress switch 750 receives the release request from tandem switch 740 and extracts the call ID from the UCI. Ingress switch 750 then checks if it has two call legs for the inbound call associated with the call ID. In this case, it does not—ingress switch 750 only has legs of the outbound call. Therefore, ingress switch 750 sends a message to tandem switch 740 with a negative acknowledgment message. Tandem switch 740 knows by the negative acknowledgment that it is the pivot point for the inbound and outbound call paths.

In response to the negative acknowledgment message, tandem switch 740 bridges the inbound and outbound calls and issues a tear down instruction to tandem switch 760. Tandem switch 760 tears down the call connections for the inbound call path and outbound call path. Tandem switch 760 also transfers a tear down instruction to service node 770. The new call path between calling device 710 and calling device 790 pivots at tandem switch 740. The call connection extends from ingress switch 730, through tandem switch 740, to ingress switch 750, thereby eliminating tromboning in service node 770 and tandem switch 740.

It should be known that the terms inbound, outbound, outgoing, upstream, and downstream, as well as other terms, are relative terms used by those skilled in the art to differentiate between calls, call paths, call legs, and the like, and to provide perspective when describing embodiments of the invention. Additionally, terms such as ingress switch and tandem switch are relative terms used by those skilled in the art to differentiate between network elements. Such terms are used for illustrative purposes and are not limiting.

Figure 9:
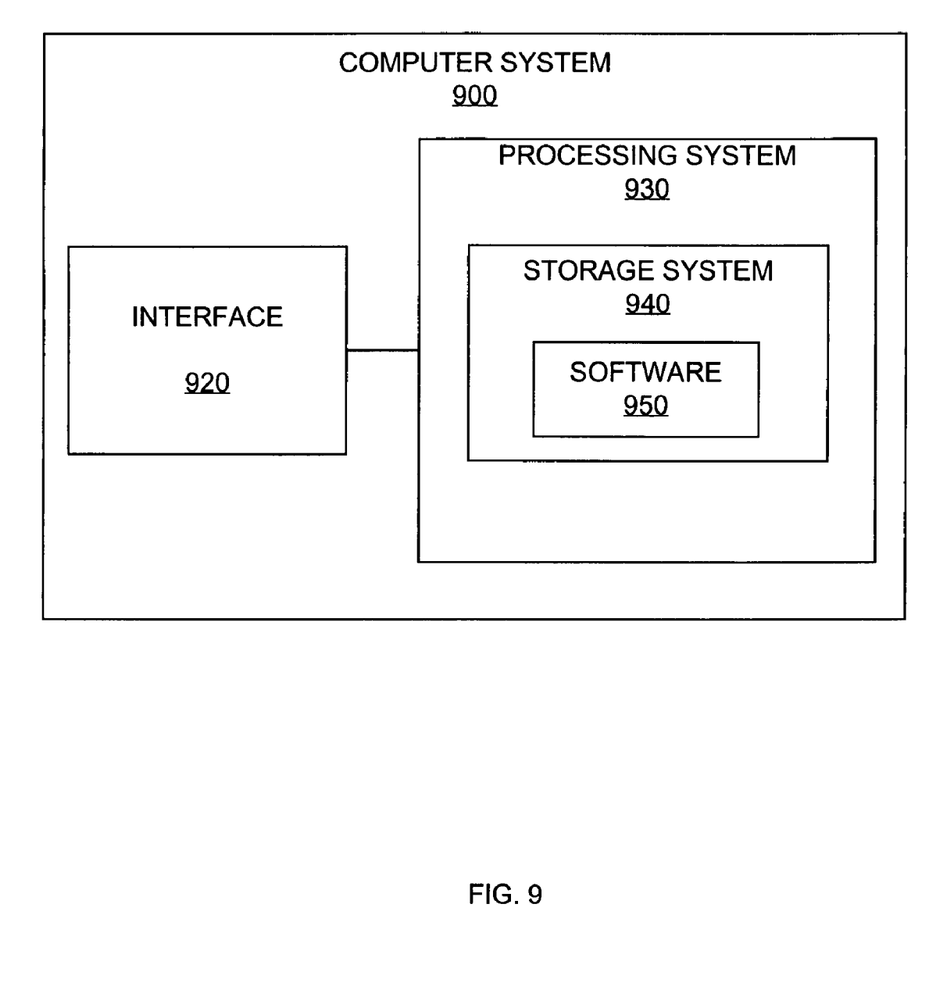
FIG. 9 illustrates a computer system in an embodiment of the invention.

Computer System—FIG. 9

FIG. 9 illustrates computer system 900 in an embodiment of the invention. Computer system 900 includes interface 920, processing system 930, storage system 940, and software 950. Storage system 940 stores software 950. Processing system 930 is linked to interface 920. Computer system 900 could be comprised of a programmed general-purpose computer, although those skilled in the art will appreciate that programmable or special purpose circuitry and equipment may be used. Computer system 900 may use a client server architecture where operations are distributed among a server system and client devices that together comprise elements 920-950.

Interface 920 could comprise a network interface card, modem, port, or some other communication device. Signaling interface 920 may be distributed among multiple communication devices. Interface 930 could comprise a computer microprocessor, logic circuit, or some other processing device. Processing system 930 may be distributed among multiple processing devices. Storage system 940 could comprise a disk, tape, integrated circuit, server, or some other memory device. Storage system 940 may be distributed among multiple memory devices.

Processing system 930 retrieves and executes software 950 from storage system 940. Software 950 may comprise an operating system, utilities, drivers, networking software, and other software typically loaded onto a general-purpose computer. Software 950 could also comprise an application program, firmware, or some other form of machine-readable processing instructions. When executed by the processing system 930, software 950 directs processing system 930 to operate as described for communication networks 400 and 700.

What is claimed is:

1. A method of operating a communication network, the method comprising:
   receiving a first control message from a first node into a second node of the communication network for a call having an inbound call path and an outbound call path wherein the first control message indicates a release request;
   processing the first control message to determine if the second node has two legs of the inbound call path; and
   if the second node has two legs of the inbound call path, transferring a second control message to a third node in the outbound call path wherein the second control message indicates the release request.

2. The method of claim 1 further comprising if the second node has two legs of the inbound call path, receiving a third message from the third node wherein the third message indicates that the third node does not have two legs of the inbound call path.

3. The method of claim 2 further comprising transferring a fourth control message from the second node to the first node indicating a tear down instruction for segments of the inbound call path and the outbound call path between the second node and the first node.

4. The method of claim 3 further comprising bridging the inbound call path and the outbound call path in the second node.

5. The method of claim 4 further comprising transferring a fifth control message from the first node to a service node indicating a tear down instruction for segments of the inbound call path and the outbound call path between the first node and the service node.

6. The method of claim 1 further comprising if the second node does not have two legs of the inbound call path, transferring a sixth control message from the second node to the first node indicating that the second node does not have two legs of the inbound call path.

7. The method of claim 1 wherein the first node comprises a tandem switch.

8. The method of claim 1 wherein the second node comprises a tandem switch.

9. The method of claim 1 wherein the third node comprises an ingress switch.

10. The method of claim 1 further comprising transferring the first control message from a service platform to the first node.

11. A communication network comprising:
    a first node configured to transfer a first control message for a call having an inbound call path and an outbound call path wherein the first control message indicates a release request; and
    a second node configured to receive the first control message from the first node and process the first control message to determine if the second node has two legs of the inbound call path, and if the second node has two legs of the inbound call path, transfer a second control message to a third node in the outbound call path wherein the second control message indicates the release request.

12. The communication network of claim 11 further comprising a third node configured to transfer a third message to the second node wherein the third message indicates that the third node does not have two legs of the inbound call path.

13. The communication network of claim 12 wherein the second node is further configured to receive the third control message from the third node and in response to the third control message transfer a fourth control message to the first node indicating a tear down instruction for segments of the inbound call path and the outbound call path between the second node and the first node.

14. The communication network of claim 13 wherein the second node is further configured to bridge the inbound call path and the outbound call path.

15. The communication network of claim 14 wherein the first node is further configured to transfer a fifth control message to a service node indicating a tear down instruction for segments of the inbound call path and the outbound call path between the first node and the service node.

16. The communication network of claim 11 wherein the second node is further configured to, if the second node does not have two legs of the inbound call path, transfer a sixth control message to the first node indicating that the second node does not have two legs of the inbound call path.

17. The communication network of claim 11 wherein the first node comprises a tandem switch.

18. The communication network of claim 11 wherein the second node comprises a tandem switch.

19. The communication network of claim 11 wherein the third node comprises an ingress switch.

20. The communication network of claim 11 wherein the first node is further configured to receive the first control message from a service platform.

* * * * *

UNITED STATES PATENT AND TRADEMARK OFFICE
CERTIFICATE OF CORRECTION

PATENT NO. : 7,643,475 B1  Page 1 of 1
APPLICATION NO. : 10/987655
DATED : January 5, 2010
INVENTOR(S) : Thomas L. Paterik It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1421 days.

Signed and Sealed this

Sixteenth Day of November, 2010

David J. Kappos
*Director of the United States Patent and Trademark Office*